No. 677,729. Patented July 2, 1901.
W. H. WOODCOCK.
CAR CONSTRUCTION.
(Application filed Apr. 12, 1900.)
(No Model.) 6 Sheets—Sheet 1.

WITNESSES:

INVENTOR:
W. H. Woodcock,

No. 677,729. Patented July 2, 1901.
W. H. WOODCOCK.
CAR CONSTRUCTION.
(Application filed Apr. 12, 1900.)
(No Model.) 6 Sheets—Sheet 2.
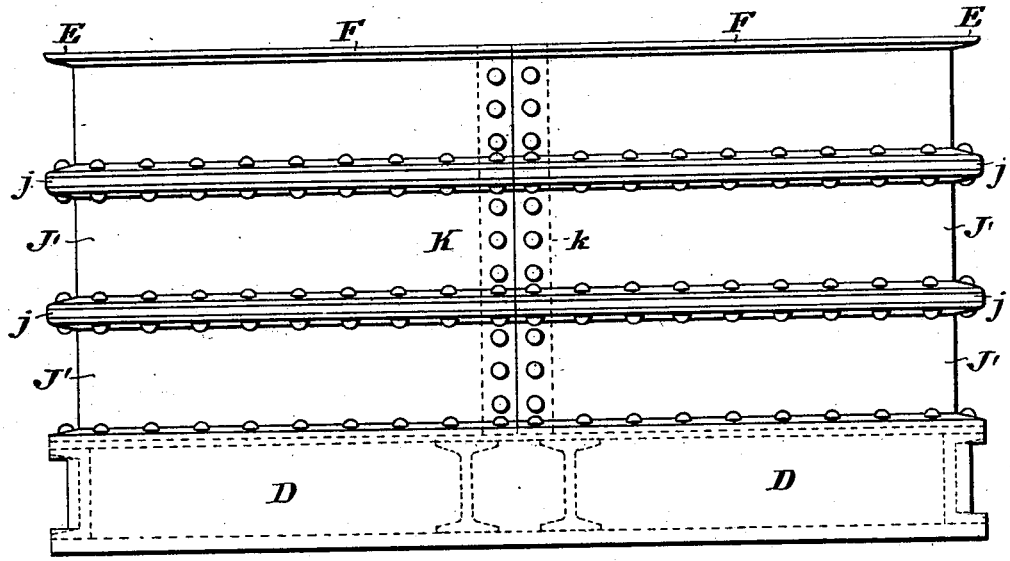
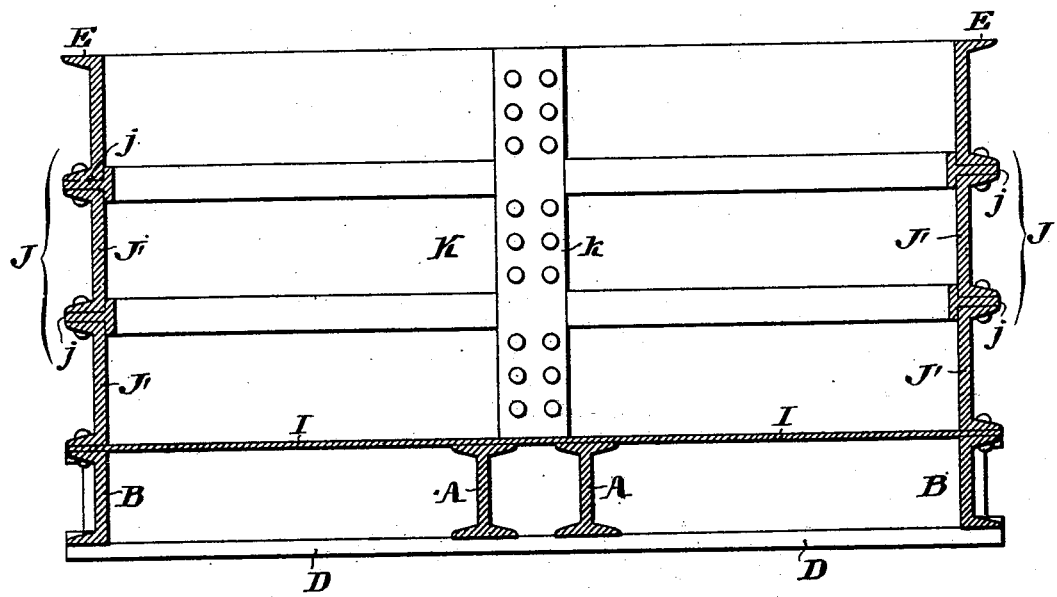

No. 677,729. Patented July 2, 1901.
W. H. WOODCOCK.
CAR CONSTRUCTION.
(Application filed Apr. 12, 1900.)
(No Model.) 6 Sheets—Sheet 3.
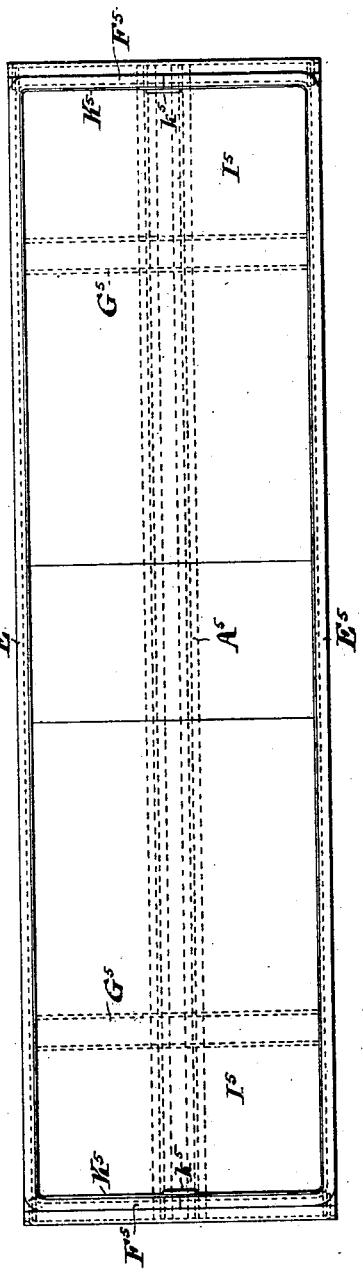
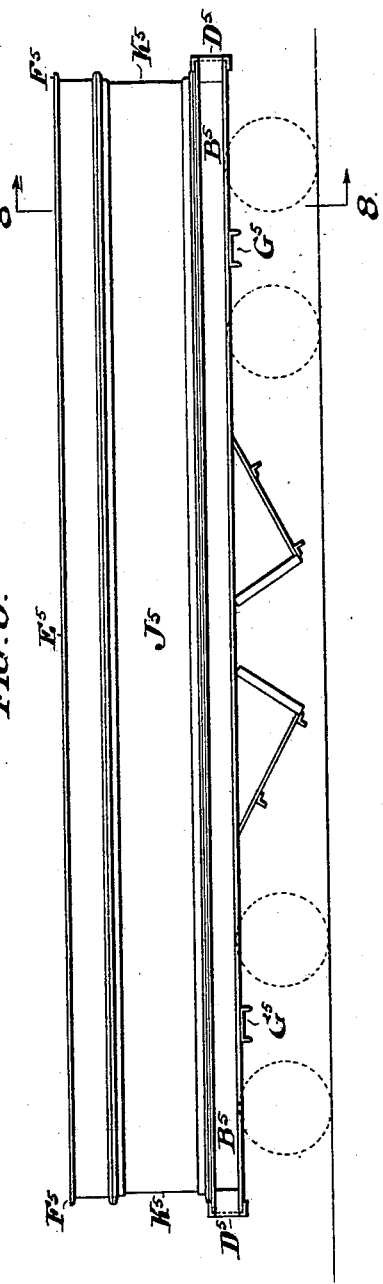
WITNESSES:
INVENTOR:

No. 677,729. Patented July 2, 1901.
W. H. WOODCOCK.
CAR CONSTRUCTION.
(Application filed Apr. 12, 1900.)
(No Model.) 6 Sheets—Sheet 4.

WITNESSES: INVENTOR:

No. 677,729. Patented July 2, 1901.
W. H. WOODCOCK.
CAR CONSTRUCTION.
(Application filed Apr. 12, 1900.)
(No Model.) 6 Sheets—Sheet 5.
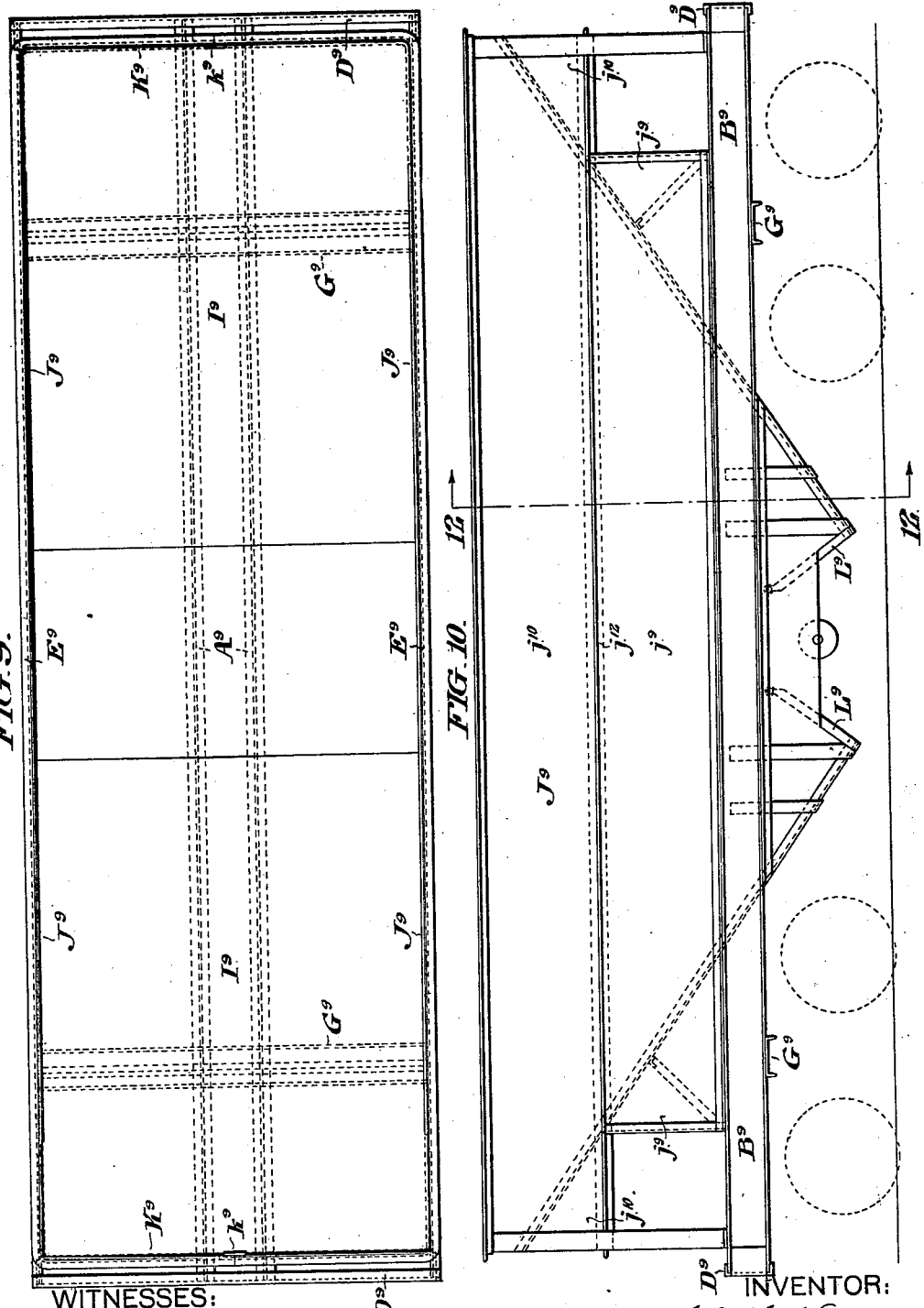

No. 677,729. Patented July 2, 1901.
W. H. WOODCOCK.
CAR CONSTRUCTION.
(Application filed Apr. 12, 1900.)

(No Model.) 6 Sheets—Sheet 6.

WITNESSES: INVENTOR:

UNITED STATES PATENT OFFICE.

WILLIAM H. WOODCOCK, OF LANSDOWNE, PENNSYLVANIA.

CAR CONSTRUCTION.

SPECIFICATION forming part of Letters Patent No. 677,729, dated July 2, 1901.

Application filed April 12, 1900. Serial No. 12,508. (No model.)

*To all whom it may concern:*

Be it known that I, WILLIAM H. WOODCOCK, a subject of the Queen of Great Britain, residing at Lansdowne, in the county of Delaware and State of Pennsylvania, have invented certain new and useful Improvements in Car Construction, whereof the following is a specification, reference being had to the accompanying drawings.

It is the object of my invention to provide metal-bodied cars, the essential members of which are so devised and combined as to be readily constructed from standard commercial rolled structural iron or steel shapes, so that said members may be manufactured at ordinary rolling-mills without special machinery adapted to car manufacture or obtained as staple articles on the market and either in their original lengths or in cut lengths readily assembled.

The employment of my invention not only avoids the use of special machinery for constructing and assembling the elements of cars of the class specified, but also effects such a reduction in the amount and grade of labor required for the manufacture thereof that a metal-bodied car having the same capacity as and a life approximately three times that of a given wooden car may be provided at a relatively low cost comparable to that of the latter.

In the accompanying drawings I have shown my improvements applied to car-bodies of several well-known types, only the details of the body portion being shown and the trucks and appurtenances being indicated diagrammatically.

Figure 1:
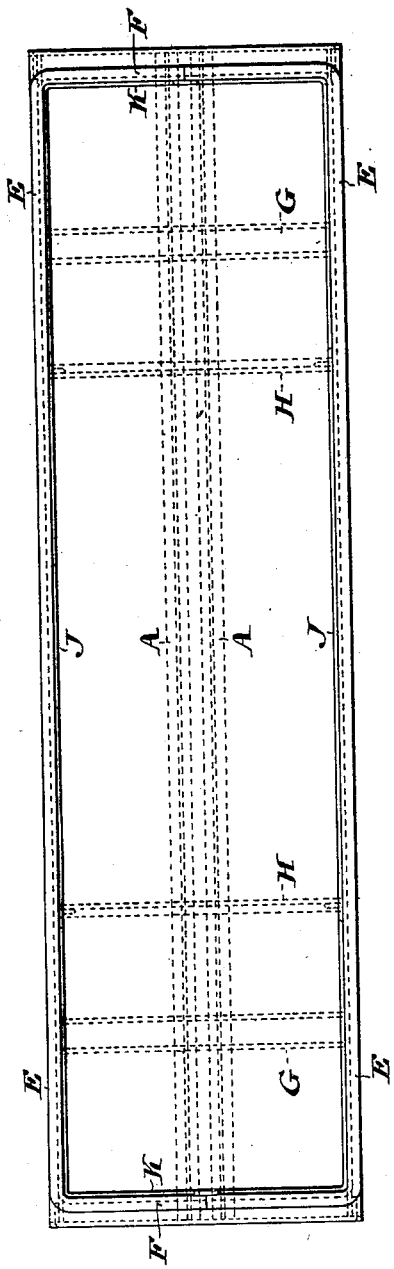
Figure 2:
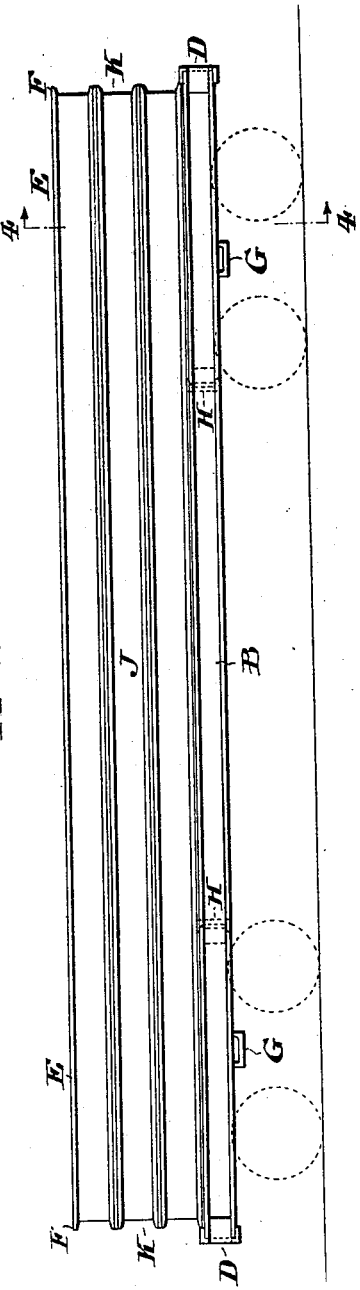
Figure 7:
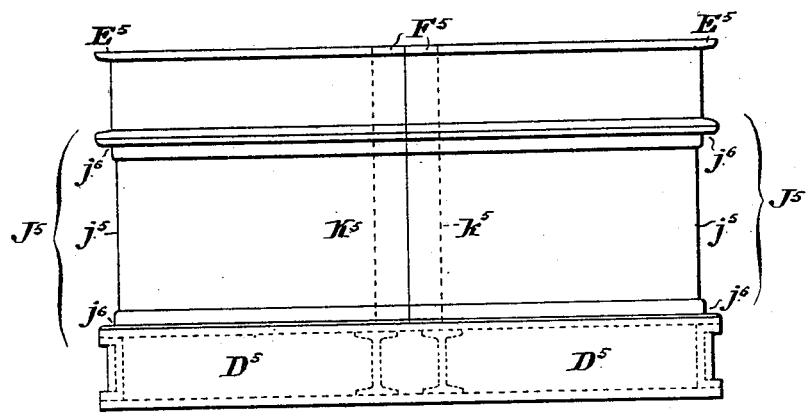

Figures 1 to 4, inclusive, show a car of the gondola type, Figs. 1 and 2 being, respectively, plan and side views thereof, Fig. 3 being an end view, and Fig. 4 a transverse sectional view thereof, taken on the line 4 4 of Fig. 2, and both being on an enlarged scale. Figs. 5 to 8, inclusive, show a hopper-bottomed coal-car, Figs. 5 and 6 being, respectively, plan and side views thereof, Fig. 7 being an end view, and Fig. 8 a transverse sectional view thereof, taken on the line 8 8 of Fig. 6, both these latter being on an enlarged scale. Figs. 9 to 12, inclusive, show a coal-car having a double-hopper bottom, Figs. 9 and 10 being, respectively, top and side views thereof, Fig. 11 being an end view, and Fig. 12 being a sectional view thereof, taken on the line 12 12 of Fig. 10.

The several groups of figures are intended to indicate convenient varieties of structural details, which are among those comprehended by the underlying principle of my invention, it being understood that the forms shown are typical of natural modifications consistent with said principle and are not restrictive of the invention to the particular types thus explained.

The various forms of cars which I have illustrated have certain common essential members, as follows: Each structure comprises members which may be termed central sills A, and side sills B, extending longitudinally with the car-body, and end sills D, extending transversely thereto, also top side rails E and top end rails F, sides J, ends K, and floors I. While these members are not necessarily different in their individual structural forms from one another or from other elements of the car-body, they are by position conveniently designated by the above names in correspondence with parts performing the same general functions in the under frame of existing types of modern cars. Supplementary to these are the body-bolsters G and needle-beams H.

Referring to the form of my invention shown in Figs. 1 to 4, inclusive, the central sills A are formed of I-beams of standard commercial size, and the side sills B B and end sills D D are formed of channel-beams or "channels" also of standard commercial size, the latter being of greater depth than the former and fitted exterior thereto, as shown in the several figures. The top side rails E E and top end rails F F are formed, as shown, of standard commercial dimensions, and the sides J J and ends K K of the car-body, between said sills and top rails, are formed of commercial channel-beams J', the members forming the respective sides of the car-body being bent at right angles to form the component fractions of the ends and joined at the median longitudinal axis of said body. The floor-plate I, which is made of standard plate metal cut to dimensions, extends between the adjoining flanges of the sills and channels J' and is riveted thereto along said flanges, as shown in Fig. 4. Said channels J' have their adjoining flanges riveted together with intervening web-flanges of the T-bars $jj$ and the head-flanges of the T-bars being in contact with the inner surfaces of the channels, as shown in section in Fig. 4, said bars serving to reinforce the sides and ends of the car. The ends of the channels, which abut at the median line of the car, are reinforced by the plate $k$, to which they are riveted, as shown in Figs. 3 and 4.

Figure 8:
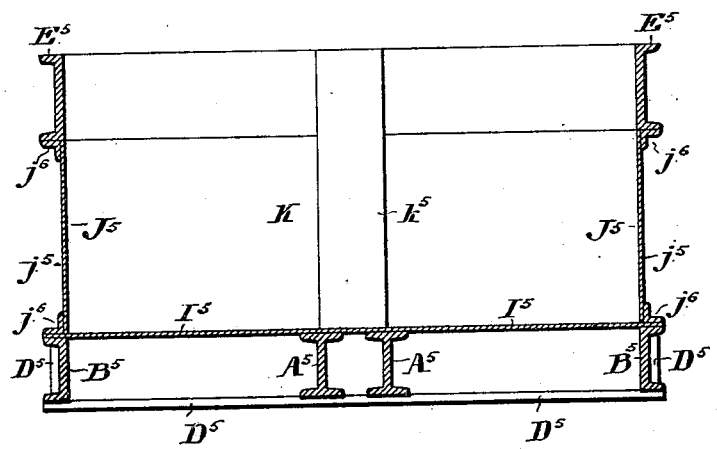
Figure 11:
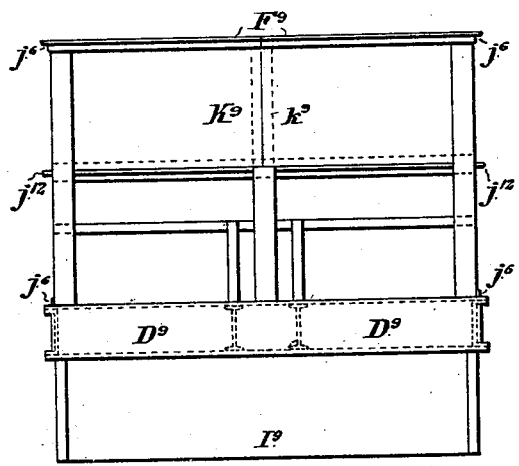
Figure 12:
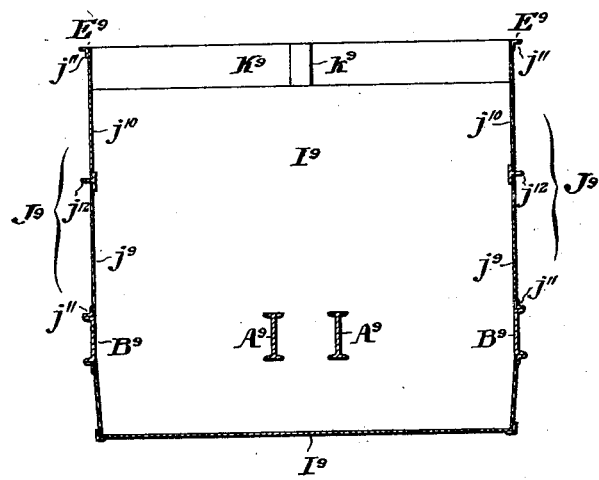

Referring to the form of my invention shown in Figs. 5 to 8, inclusive, the side sills $B^5 B^5$, end sills $D^5 D^5$, top side rails $E^5 E^5$, and top end rails $F^5 F^5$ are formed of channels, as above described. However, the sides $J^5$ and ends $K^5$ of the car-body intermediate of said sills and top rails may be formed of a single integral channel or of a composite channel built up of the plates $j^5$ and angle-bars $j^6$, as shown, the horizontal flanges of the latter being applied to the flanges of the rails and sills, as shown in Fig. 8, and secured by rivets extending through the contiguous parts. The abutting ends of the members forming the car sides $J^5$ and ends $K^5$ are joined and reinforced at the median line of the car by means of plates $k^5$.

Referring to the form of my invention shown in Figs. 9 to 12, inclusive, the car sides $J^9$ and ends $K^9$ between the top rails and the side and end sills consist of superimposed composite channels built up of the plates $j^9$ $j^{10}$ and angle-bars $j^{11}$ and centrally reinforced by the T-bars $j^{12}$. As shown in Fig. 10, the floor of this type of car is formed of inclined hopper-plates $l^9$, terminating at the central portion of the car in opposed openings, which are normally closed by swinging doors $L^9$. The lower plates $j^9$, forming the side of the car-body, may be terminated short of the ends of the latter, as shown in Fig. 10.

It is to be understood that the various members aforesaid may be secured together by bolts or by rivets, as shown in Fig. 3, &c. Such securing means are, however, omitted from certain figures of the drawings in order to simplify the latter.

In using the term "metal" in my claims I mean to comprise iron and steel in all their various grades or modifications which may be employed for structural purposes.

I claim—

1. A metal-bodied car, the essential members of which consist of lengths of commercial rolled structural metal shapes; the members forming the respective sides of the car-body being bent at right angles to form the component fractions of the ends and joined at the median longitudinal axis of said body, substantially as set forth.

2. A railway-car having its body formed of flanged rolled metal beams placed vertically on flange, each horizontal layer of such beams being composed of two beams bent to the rectangular contour of the car underframe, the ends of the two beams abutting and tie-plates uniting said abutting ends, substantially as herein shown and described.

WILLIAM H. WOODCOCK.

Witnesses:
JAMES H. BELL,
E. REESE.